(12) United States Patent
Steinhauser et al.

(10) Patent No.: US 11,614,550 B2
(45) Date of Patent: Mar. 28, 2023

(54) X-RAY DETECTOR WITH FOCUSED SCINTILLATOR STRUCTURE FOR UNIFORM IMAGING (71) Applicant: KONINKLIJKE PHILIPS N.V., Eindhoven (NL)

(72) Inventors: Heidrun Steinhauser, Eindhoven (NL); Onno Jan Wimmers, Valkenswaard (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/046,105

(22) PCT Filed: Apr. 4, 2019

(86) PCT No.: PCT/EP2019/058471
§ 371 (c)(1),
(2) Date: Oct. 8, 2020

(87) PCT Pub. No.: WO2019/197263
PCT Pub. Date: Oct. 17, 2019

(65) Prior Publication Data
US 2021/0239860 A1 Aug. 5, 2021

(30) Foreign Application Priority Data
Apr. 12, 2018 (EP) .................. 18167073

(51) Int. Cl.
*G01T 1/20* (2006.01)
*G01N 23/04* (2018.01)
*G01T 1/202* (2006.01)

(52) U.S. Cl.
CPC ......... *G01T 1/20186* (2020.05); *G01N 23/04* (2013.01); *G01T 1/202* (2013.01)

(58) Field of Classification Search
CPC ...... G01T 1/20186; G01T 1/202; G01N 23/04
See application file for complete search history.

(56) References Cited

U.S. PATENT DOCUMENTS 4,709,382 A * 11/1987 Sones .................... A61B 6/032
378/146
5,410,156 A * 4/1995 Miller ....................... G01T 3/06
250/390.11
(Continued)

FOREIGN PATENT DOCUMENTS

| EP | 1045398 A2 | 10/2000 |
| WO | WO2010018496 A2 | 2/2010 |
| WO | WO2018122213 A1 | 7/2018 |

OTHER PUBLICATIONS

PCT International Search Report, International application No. PCT/EP2019/058471, dated Jul. 2, 2019.
(Continued)

*Primary Examiner* — Blake C Riddick
(74) *Attorney, Agent, or Firm* — Larry Liberchuk (57) ABSTRACT

Dual layer detector (XD) for X-ray imaging, comprising at least two light sensitive surfaces (LSS1,LSS2). The dual layer detector further comprises a first scintillator layer (SL, SL1) including at least one scintillator element (SE) capable of converting X-radiation into light, the element having two faces, an ingress face (S1) for admitting X-radiation into the element (SE) and an egress face (S2) distal from the ingress face (S1), wherein the two faces (S1,S2) are arranged shifted relative to each other, so that a longitudinal axis (LAX) of the scintillator element (SE) is inclined relative to a normal (n) of the layer. The scintillator element (SE) has a sidewall (w,w1) extending between the two faces (S1,S2), the scintillator layer (SL) further comprising a second such scintillator element (SE') having a sidewall (w',w1'), the second scintillator element (SE') neighboring the first scintillator
(Continued)

element (SE), wherein the sidewall (w,w1) of the first scintillator element (SE) and the sidewall (w',w1') of the second scintillator element (SE) are neighbored and are inclined relative to each other. The dual layer detector (XD) further comprises a second such scintillator layer (SL2). One of the light sensitive surfaces (LSS1,LSS2) is arranged in between the two scintillator layers (SL1, SL2).

12 Claims, 7 Drawing Sheets

(56) References Cited

U.S. PATENT DOCUMENTS

| | | | | |
|---|---|---|---|---|
| 5,943,388 | A * | 8/1999 | Turner | G01V 5/0041 378/98.9 |
| 5,949,850 | A | 9/1999 | Tang | |
| 6,473,486 | B2 | 10/2002 | Hoffman | |
| 7,636,419 | B1 | 12/2009 | Nelson | |
| 7,692,156 | B1 * | 4/2010 | Nagarkar | G01T 1/1644 250/370.11 |
| 7,692,165 | B2 | 4/2010 | Nagarkar | |
| 2006/0202128 | A1 * | 9/2006 | Berger | G01T 1/2002 250/370.11 |
| 2007/0098138 | A1 | 5/2007 | Bessho | |
| 2007/0194242 | A1 * | 8/2007 | Fiedler | G01T 1/2985 250/370.11 |
| 2010/0200760 | A1 * | 8/2010 | Baeumer | H01L 27/14603 250/366 |
| 2011/0096892 | A1 * | 4/2011 | Forthmann | A61B 6/4241 378/5 |
| 2011/0280367 | A1 * | 11/2011 | Baeumer | A61B 6/032 378/9 |
| 2012/0223239 | A1 | 9/2012 | Bernhardt | |
| 2013/0292574 | A1 | 11/2013 | Levene | |
| 2015/0248782 | A1 * | 9/2015 | Proksa | A61B 6/482 382/131 |
| 2016/0154120 | A1 * | 6/2016 | Suponnikov | G01T 1/2012 250/361 R |
| 2017/0090042 | A1 | 3/2017 | Shedlock | |
| 2017/0322320 | A1 | 11/2017 | Jacobs | |
| 2018/0052240 | A1 * | 2/2018 | Tanabe | H01L 27/14634 |
| 2018/0136340 | A1 * | 5/2018 | Nelson | A61B 6/4241 |
| 2018/0172848 | A1 * | 6/2018 | Nelson | A61B 6/025 |
| 2019/0187302 | A1 * | 6/2019 | Nelson | A61B 6/4417 |

OTHER PUBLICATIONS

Alvarez R. et al., "Energy-Selective Reconstructions in X-Ray Computerized Tomography", Phys. Med. Biol., vol. 21, No. 5, 1976, pp. 733-744.

* cited by examiner

X-RAY DETECTOR WITH FOCUSED SCINTILLATOR STRUCTURE FOR UNIFORM IMAGING

FIELD OF THE INVENTION

The invention relates to a scintillator layer, to an X-ray detector, to an X-ray imaging apparatus, to a computer program element and to a computer readable medium.

BACKGROUND OF THE INVENTION

Some X-ray imaging systems use detectors of the indirect conversion type. Indirect conversion type detectors comprise broadly a scintillator and sensors. The scintillator converts incoming X-radiation into light. The light is then detected by the sensors. Suitable sensors include photodiodes. The photodiodes convert the light into electrical signals. The electrical signals may then be converted into image values. The image values can be used to obtain X-ray imagery of a patient's anatomy of interest.

WO 2010/018496 describes an X-ray imaging system with indirect conversion type detector technology. The scintillator is formed from grown crystal needles, for instance CsI (Cesium Iodine). The technology uses additional components such as a planarizing layer placed on top of the crystalline scintillator to achieve a plane surface.

Also, imaging properties for portions of the detector may not be uniform across the detector surface.

Furthermore, the scintillator formed from grown crystal needles may not lend itself easily for use in dual layer detectors.

SUMMARY OF THE INVENTION

There may be a need for an alternative scintillator solution for X-ray imaging, in particular for X-ray imaging with dual layer detectors.

The object of the present invention is solved by the subject matter of the independent claims where further embodiments are incorporated in the dependent claims. It should be noted that the following described aspect of the invention equally applies to the X-ray detector, to the X-ray imaging apparatus, to the computer program element and to the computer readable medium.

According to a first aspect of the invention there is provided a dual layer detector for X-ray imaging, comprising:

at least two light sensitive surfaces;

a first scintillator layer including at least one scintillator element capable of converting X-radiation into light, the element having two faces, an ingress face for admitting X-radiation into the element and an egress face distal from the ingress face, wherein the two faces are arranged shifted relative to each other, so that a longitudinal axis of the scintillator element is inclined relative to a normal of the layer; the first scintillator element having a sidewall extending between the two faces. One or both of the scintillator layers further comprises a second such scintillator element having respective two faces, and a sidewall that extends between the two faces of the second scintillator element and is opposite, or neighbors, the sidewall of the first scintillator. The sidewall of the first scintillator element and the sidewall of the second scintillator element are inclined relative to each other;

a second such scintillator layer; and wherein the at least one of the two light sensitive surfaces are arranged in between the two scintillator layers.

The X-ray detector of the dual layer type may be used for spectral/dual energy imaging.

The respective longitudinal axis defines in particular a propagation direction of the X-radiation/light through a portion (the "body") of the scintillator element between its faces.

Alignment is effected in and of itself by the oblique shape. There is no need for rotated arrangements of the scintillator elements.

The faces of all elements define the proximal and distal surfaces of the scintillator layer. The faces of a given elements are parallel. Due to the inherent obliqueness, the faces form flush proximal and/or distal surfaces of the scintillator layer. No additional components such as planarizer layer is required to achieve the flushness of the surface.

In addition, the proposed 3D pixelated scintillator structure with focal-spot alignment allows achieving a uniform X-ray detection over essentially the entire image surface of the detector, in particular in indirect conversion type detectors. The uniform X-ray detection results in optimal (or at least improved) imaging properties. Specifically, imaging properties are more uniform. For example, some or all of IQ (image quality), MTF (modulation transfer function), spectral response, DQE (detective quantum efficiency), etc will be more uniform across the detector's imaging area, more specifically, will be more uniform towards edges of the imaging area/surface.

In embodiments, the at least one element has an oblique prism shape or an oblique conical or pyramidal shape.

In embodiments, a cross-section of said at least one element is a polygon.

In embodiments, cross sections of the at least one scintillator element are constant along its longitudinal axis.

In embodiments, the two faces are arranged shifted along at least two different directions (x,z). In other words, the inclination comprises at two least inclination components in two different planes. This "2D alignment" is particularly useful for planar detector arrangements, where alignment can be improved for row (or columns) of scintillator elements that do not intersect the optical axis/center point of the detector's image surface.

In embodiments, the at least one element is formed by additive manufacturing, in particular by 3D printing. This allows efficient production of the proposed scintillator laver.

In embodiments manufacturing comprises the step of providing sub-layers from which the scintillator layers are to be build.

In a further step, the scintillator layer having the scintillator elements is then formed by additive manufacturing.

In a further step, light reflective material is applied to fill interspaces between the scintillator elements.

In embodiments, the light reflective substance at least partly surrounds the element (s). The light reflective substance allows more efficient use of the light generated by the scintillator element upon exposure to X-radiation.

In embodiments, one or both of the scintillator layers comprise, respectively, a plurality of such elements, with respective longitudinal axes of the elements passing through their respective faces and the axes aligned so as to focus on an imaginary spatial point located outside the layer. When used in an X-ray imager, the imaginary spatial point corresponds to the focal spot of the X-ray source of the imaging apparatus. The obliqueness (or inclination) of the scintillator elements vary (in one dimension or both dimensions) over the scintillator surface so as to provide improved imaging properties even for detector portions further away from the optical axis. Not all elements need to be oblique however. In particular, there is no inclination (with longitudinal axes being perpendicular) for elements at or close to the optical axis.

In embodiments envisaged herein, the X-ray detector comprises at least two sensor layers, each having a respective one of the two light sensitive surfaces. In other words, each of the two sensor layers has its own light sensitive surface. In embodiment, the two sensor layers are stacked so that the light sensitive surfaces are oriented in opposite directions.

Each light sensitive surface, or sensor layer, has a respective scintillator layer associated thereto, preferably through optical coupling.

The proposed scintillator layers facilitate construction of such a dual layer detector due to inherently flush proximal and/or distal surface of the scintillator layers, thanks to the obliqueness of the scintillator elements. This is because the flushness of the proximal/distal surfaces promotes inherent structural stability when stacking the layers onto each other when building the spectral/dual imaging detector.

In embodiments a single sensor layer can be used that is light sensitive from both of its sides, thus presenting the two light sensitive surfaces, a distal and a proximal one.

Having the two light sensitive surfaces arranged in between the two scintillator layers allows, in embodiments, using the same pixel pitch layout in the two light sensitive layers. Specifically, the same equidistant pixel pitch layout may be used in the two light sensitive layers in embodiments.

The two inclined (non-parallel) sidewalls of the two neighboring elements define a wedge-shaped interspace or gap. The interspace may be partly of fully filled with light reflective material. Not necessarily all scintillator elements have their neighboring sidewalls so inclined. Having inclined sidewalls of neighboring scintillator elements are useful when using the scintillator in a dual layer detector for dual imaging, in particular with equidistant pixel pitch layout.

Having inclined sidewalls of neighboring scintillator elements as envisaged are also useful because they allow to decrease, or even minimize, a distance between pixels to eliminate light transmission through the light reflective material. There will be more volume of (possibly somewhat ductile) reflector material when using slanted side walls. Having the mutual inclined or slanted sidewalls may hence result in a better robustness of the scintillator assembly against external forces such as an accidental drop, or when the detector, in which the proposed scintillator is used, hits an object during imaging such as in C-arm systems or mobile X-ray systems in field use.

Having inclined sidewalls of neighboring scintillator elements may also be of benefit in multi-X-ray-source imaging systems, where the X-ray detector may be partitioned into different regions, and each region detects light from another X-ray source or another combination of X-ray sources.

In a further aspect there is provided an X-ray imaging apparatus having an X-ray detector and an X-ray source with a focal spot. The X-detector comprises at least one scintillator layer as per any one of the above described embodiment, the at least on element having its longitudinal axis aligned with said focal spot.

In a further aspect there is provided a computer program element, which, when being executed by at least one processing unit, is adapted to cause a material forming device to form at least a part of the scintillator layer as per any one of the above described embodiments.

In embodiments, the computer program element comprises a CAD ("computer aided design") file for 3D printing.

In a further aspect there is provided a computer readable storage medium having stored thereon the program element.

"Oblique" or "Obliqueness" as used herein is taken to indicate an inclination of a longitudinal axis of an individual scintillator element in the scintillator layer relative to a vertical direction which generally corresponds to the optical axis the imaging apparatus. The axis may be inclined in only one plane, or may have inclination components in at least two planes.

As frequently used herein, "3D", "2D", and "1D" are to mean (spatial) three-, two-, or one-dimensionality, respectively.

BRIEF DESCRIPTION OF THE DRAWINGS

Exemplary embodiments of the invention will now be described with reference to the following drawings, which are not to scale, wherein.

DETAILED DESCRIPTION OF EMBODIMENTS

Figures 1, 1A:
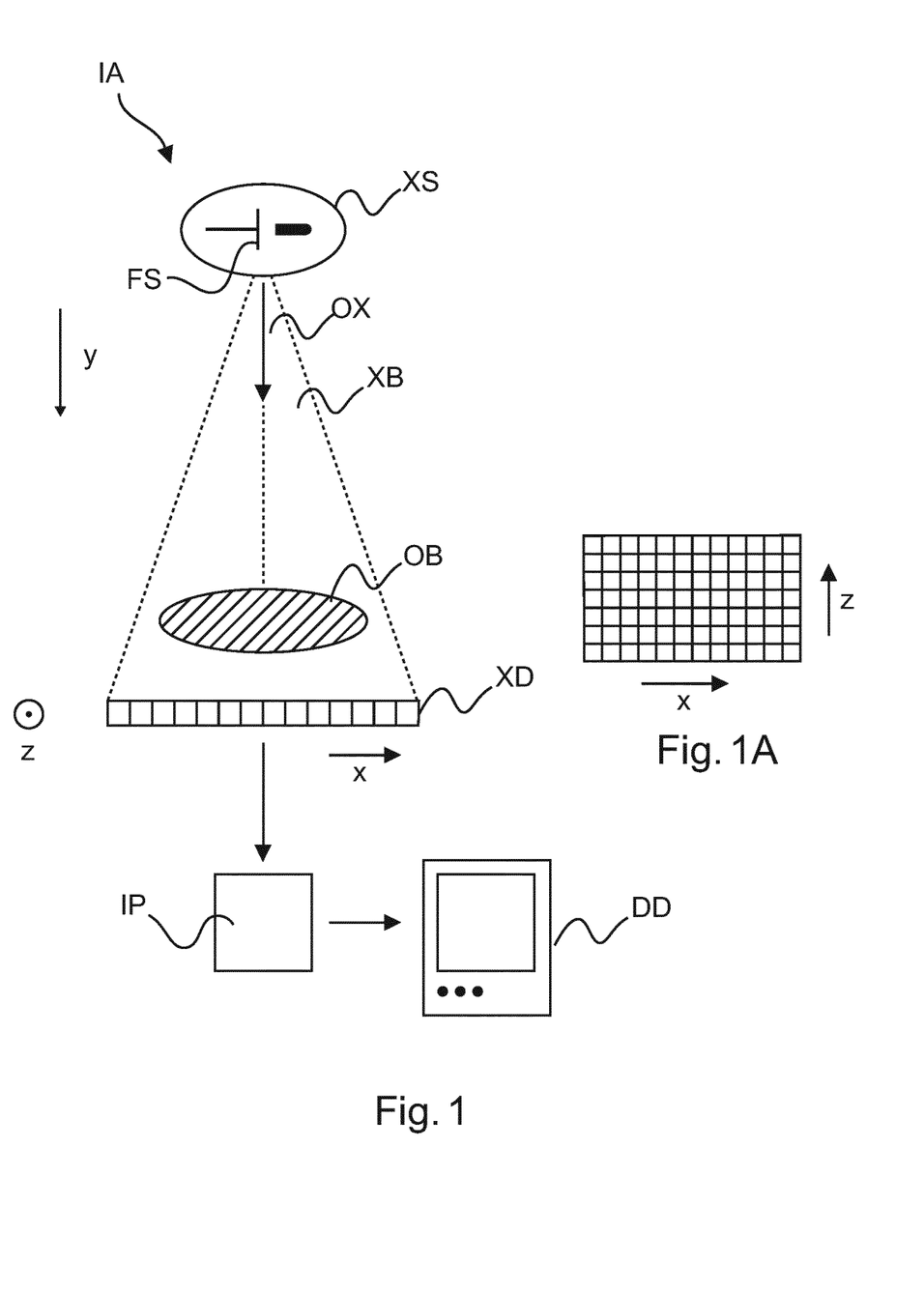
FIG. 1 shows a schematic side elevation view of an X-ray imaging apparatus.

With reference to FIG. 1, this is a schematic diagram of an X-ray imaging apparatus IA in side elevation view. Embodiments of this include a C-arm imaging apparatus, a CBCT (Cone Beam CT) scanner, a CT scanner, a mammography apparatus or a radiography apparatus, or other, configured to acquire an X-ray image of an object OB. The object OB is shown in cross-section with an imaging axis z. In FIG. 1, the imaging axis z extends into the drawing plane. Although main applications for the X-ray imager envisaged herein are in the medical field, non-medical contexts such as non-destructive material testing or baggage screening, etc. are not excluded herein. Accordingly, the term "object OB" is used herein in the general sense to include animate "objects" such as a human or animal patient, or anatomic parts thereof but also includes inanimate objects.

In more detail, the X-ray imaging apparatus IA includes an X-ray source XS and an X-ray sensitive detector XD. In use, the object OB is positioned along axis z in an examination region within the X-ray source XS and the X-ray detector XD. The X-ray source XS is energized to produce an X-ray beam XB which emanates from a focal spot FS and traverses the examination region and hence at least a region of interest of the object OB. In FIG. 1, OX is the optical axis, and the main propagation direction of the X-ray beam XB, with axis y parallel to OX. Specifically, the optical axis OX runs from the focal spot FS to detector XD and intersects same at a point that forms the orthogonal projection of the focal spot onto the detector's image surface. This point will be referred to herein as the center point of the detector or image surface. The image surface has coordinates x,z, with x being orthogonal to imaging axis z, and both, x,z, being orthogonal to the optical axis OX or axis y.

The X-radiation interacts with matter (e.g., tissue, bones, etc.) of the object OB. After interaction, the X-radiation emerges at the far side of object OB to then impinge on the X-ray detector XD. The impinging X-radiation is detected by the detector XD and converted into electrical signals. The electrical signals are converted by suitable conversion circuitry (not shown) into image values which may then be processed into X-ray images by an image processor IP. Suitable imaging software (such as 3D reconstruction) may be used to effect display of the imagery on one or more display devices DD. The images may also be stored or otherwise processed.

The X-ray images are capable of showing details of the internals of the imaged object OB. This can help in diagnosis and therapy or other examination of the imaged object OB.

The imager IA may also include a collimator (not shown) situated at the X-ray source to shape the X-ray beam to better conform with a region of interest to be imaged.

The detector XD may be a flat panel detector, but curved embodiments are also envisaged herein. In embodiments, the detector XD is preferably of the indirect conversion type. In inset FIG. 1A there is shown, in plan view, a schematic grid layout that represents an image surface of the X-ray detector XD with axes x,z and the four outer edges of the image surface. Axis z is the imaging axis as introduced above. The small squares in the grid layout of FIG. 1A represent detector cells or pixels that are arranged in multiple "rows" (by convention, along direction x) and "columns" (by convention, along direction z). Alternatively, single line/row detectors are also envisaged herein in the alternative.

As mentioned, the image surface may be planar as shown in FIG. 1A or may instead be curved to form a partial lateral surface of an imaginary cylinder with longitudinal axis (referred to hereinafter as "axis of curvature") through focal spot FS of the X-ray source XS and parallel to axis z. In these embodiments, the image surface of the detector XD is focused as a whole to the focal spot of the X-ray source XS.

Figure 2:
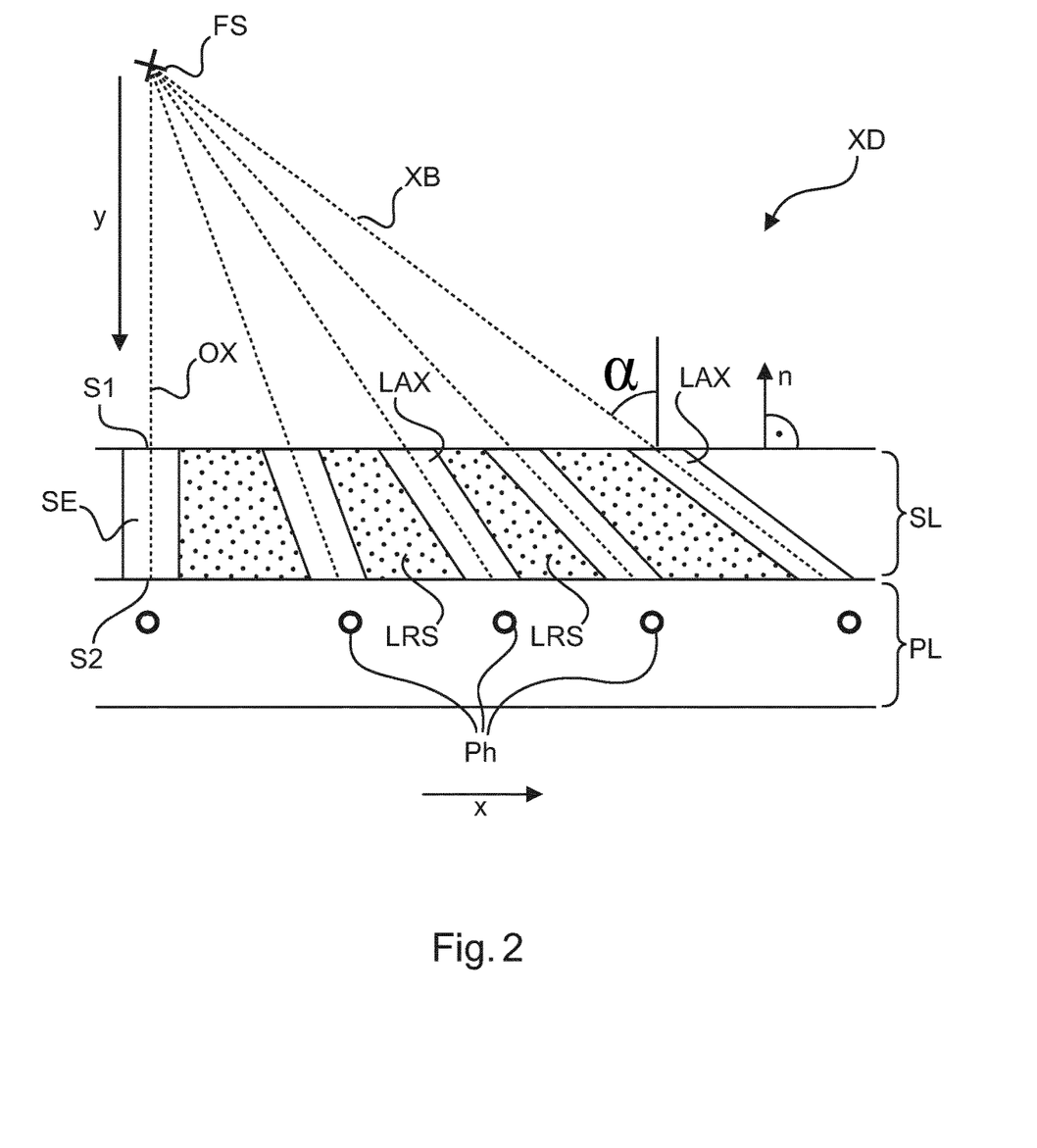
FIG. 2 shows a schematic sectional side view of a scintillator layer.

Referring now to FIG. 2, this shows the X-ray detector XD in more detail. Specifically, FIG. 2 is a sectional side elevation of the X-ray detector XD. The embodiment shown in FIG. 2 corresponds to a planar image surface x,z but unless specifically stated the below is of equal application to the curved embodiments.

In the indirect conversion type technology, the detector XD includes two layers, a scintillation layer SL and a sensor layer PL. In contrast to the embodiment shown in FIG. 2, dual energy or spectral imaging is also envisaged herein with specifically adapted detectors XD where there is not only single pair of a sensor-scintillator layers (as in FIG. 2) but there are two or more such pairs arranged, one on top of the other, in exemplary embodiments with sensor layers PL1, PL2 back-to-back. Such dual/spectral imaging detectors will be described in more detail below at FIGS. 5 and 6. For simplicity however, we shall restrict ourselves first to discuss detectors XD with single pair of sensor-scintillator layers as shown in FIG. 2.

The scintillator layer SL may be arranged proximal to the X-ray source, with the sensor layer PL being distal to the focal spot. In alternative embodiments, this arrangement is reversed so that it is the sensor layer PL that is proximal and the scintillator layer SL is distal. Here and in the following the spatial qualifiers "proximal" and "distal" are used to indicate, respectively, a closer or larger distance relative to the focal spot FS. During imaging, photons of the X-ray beam XB impinge the scintillator layer SL and penetrate same. The scintillator layer SL includes scintillating material, in other words, material that is capable of converting the impinging X-radiation into an electromagnetic radiation of a different frequency, in particular into visible light. Specifically, the internal molecular structure of scintillator materials is such that a light photon is released when the material is struck by an X-ray photon. The light photons so generated by the scintillator layer are then detected by an array of photosensitive pixels in the sensor layer PL. In embodiments, the sensor layer PL is a sensor array comprising a substrate layer BL (such as foil or other) on which a plurality of photosensitive pixels (comprising photo-diodes Ph and TFTs) are arranged. The plurality of photosensitive pixels PH form at least one light sensitive surface LSS of the sensor layer PL. Different variations and types of photo-diodes Ph and TFTs are envisaged herein, such as organic or silicon based, or a combination of both. In the sectional view afforded in FIG. 2 only one row of photodiodes PH is shown (as an example, only five photodiodes of the row are shown). Further rows are arranged in parallel and along the z-axis behind the one shown on the drawing plane of FIG. 2 to achieve the grid layout shown in FIG. 1A. The photo diodes Ph are coupled to read-out-circuitry (not shown) to collect the electrical signals that are generated by the respective photo diodes Ph upon detecting a respective light photon.

With continued reference to the scintillator layer SL, this includes in one embodiment a plurality of scintillator elements SE that confer a pixelated structure on the scintillator layer SL. Specifically, as envisaged in embodiments, the scintillator elements SE are discrete 3D structures preferably laid out in the same layout as the photo diodes Ph. The scintillator elements thus likewise form a grid layout as per the plan view of FIG. 1A, so that the scintillator elements and the sensors Ph are in spatial registry with each other, each photo sensor Ph being arranged in opposed relationship to a respective one of the scintillator elements. Other embodiments are possible, for example, a group of neighboring sensors Ph may share the same scintillator element. For example, groups of 2×2 or 4×4 neighboring sensor elements may share the same scintillator element. Consequently, in embodiments with single row/column of sensors Ph there is only a single row of such discrete scintillator elements arranged in spatial registry.

In the example shown in FIG. 2, there are only five scintillator elements of a row but this number is merely exemplary and not limiting. In general, the number of scintillator elements may be lower or as high as the number of detector pixels and hence as the number of sensors (eg, photo diodes). For example, the detector XD image surface may be of a size of X=40 cm by Z=30 cm, and this is indeed envisaged in embodiments. Depending on the required pixel density, this arrangement may hence call for 400 by 300 sensors Ph, with about the same number of scintillator elements in case of a CBCT scanner with a pixel size of 1 mm, similar to CT. In case of a C-arm system, smaller pixel sizes, e.g. 150 μm, can be used leading to more elements SE. In case of sensor sharing, there are less elements SE than sensors Ph as mentioned above. The size of the detector is generally determined by the size of the object to be imaged, and can be larger or smaller than the above example. For instance, Z>40 cm and/or X>30 cm are also envisaged herein.

Each scintillator element SE comprises scintillating material that effects the conversion from X-radiation into the desired electromagnetic radiation, such as visible light. The scintillator elements as envisaged herein are preferably not formed from whole grown crystal needles (such as CsI) as in previous systems (see for instance in Applicant's WO 2010/018496), but are instead 3D manufactured, in embodiments, from a material that includes scintillator particles (which may or may not be crystalline) embedded in a binder mass. The exact composition and manufacture of the scintillator elements will be explained in more detail further below at FIG. 8.

Turning first in more detail to the shape of the scintillator elements SE, this can be seen in FIG. 2. The scintillator elements are formed so that they are aligned in themselves towards the focal spot FS of the X-ray imaging system IA. In particular, some of the scintillator elements are oblique so as to be aligned, at least in one plane, with the focal spot of the X-ray source. Yet more specifically, in embodiments, respective longitudinal axes LAX of elements SE, shown in dashed lines in the cross-section plane of FIG. 2, are inclined towards the focal spot FS. As can be seen in FIG. 2, the scintillator element SE is not merely rotated to effect this alignment with the focal spot FS, but it is rather the obliqueness of the scintillator element SE shape itself that effects this alignment. FIG. 2 merely shows the elements SE of one row aligned with FS. It will be understood, that what has been said above applies equally to some or all rows situated along axis z, behind the row shown in FIG. 2.

In addition to the inclination shown in FIG. 2, in embodiments there may be a second inclination component in a different plane, for instance along direction z that extends into the drawing plan in FIG. 2. In other words, the elements SE may be inclined in two spatial directions, eg, x and z, so that the LAX points in 3D space to the location of FS. This arrangement may be referred to as a "2D alignment" where there is inclination in at least two different planes. In the view of FIG. 2, one plane corresponds to the drawing plane, the other is perpendicular thereto and passes through the focal spot FS.

In distinction, the "1D alignment" (and for such we refer to this type of arrangement hereinafter), the LAX is inclined merely in a single plane for each row of elements and intersects at imaginary points FS'. One such imaginary point FS' corresponds to the focal spot FS only for the row that passes through the center point. The respective imaginary points for the other rows form a line that passes through the focal spot FS and is perpendicular to the plane as per drawing planes of FIG. 1,2.

In the 2D alignment, the extensions of the respective longitudinal axes intersect in 3d when viewed from any direction perpendicular to the optical axis OX. In other words, elements SE with same angular obliqueness are arranged in respective concentric circles around the center point.

It will be understood that FIG. 2 is highly schematic, with distances not to scale. For instance, the distance of focal spot FS to the detector XD is drawn way shorter than in reality.

The pitch (that is, the distance between neighboring pixels Ph) may be equidistant (regular pitch layout) or may differ (irregular pitch). In FIG. 2, an irregular pitch layout is shown.

As can be seen, due the different obliqueness, the distances (along x) between the faces S2 (or, alternatively, between faces S1) are preferably irregular. There may be regular in other embodiments, if some neighboring elements SE have the same obliqueness.

Also, in FIG. 2, the widths (along axis x) of the reflective material LRS fillings are not to scale. The width is largely exaggerated and is usually much thinner compared to the width (along axis x) of the scintillator elements SE. For example, the width of the fillings LRS may be about $1/10$ or less of the width of the scintillator elements SE.

Figure 3:
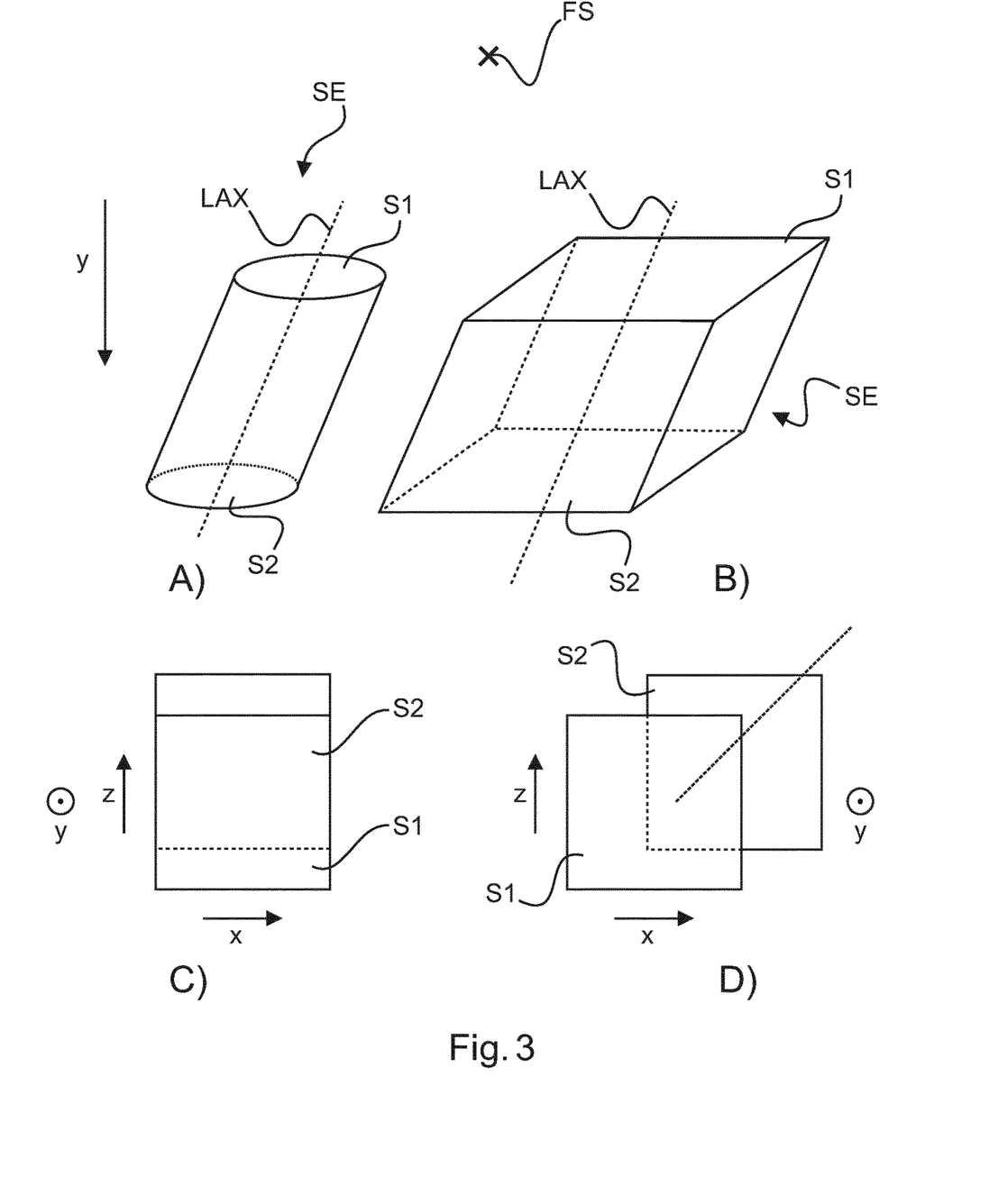
FIG. 3 shows schematic perspective views and schematic plan views of a scintillator element in different embodiments.

Referring now to FIG. 3, this shows various embodiments of scintillator element SE shapes as envisaged herein. FIGS. 3A and 3B are perspective views and FIGS. 3C and 3D are plan views along axis y as seen from the focal spot FS.

In embodiments, some or all scintillator elements SE are oblique cylinders or oblique prisms as shown in FIGS. 3A and 3B, respectively. The longitudinal axis LAX of a given scintillator element SE passes through two faces, S1 and S2 which, in embodiments, are the bases of the oblique prism or cylinder. In use, one face S1 is proximal and the other face S2 is distal. The faces S1, S2 may have any regular or irregular polygon or regular or irregular curved shape (circular, elliptic etc.). Embodiments for the polygonal base faces S1, S2 include triangles, rectangles, squares or parallelograms. The scintillator element SE may be formed as an oblique rectangular prism. As shown in the specific embodiment of FIG. 3B, the scintillator element SE is a parallelepiped. In embodiments, the element has parallelograms as cross-sections in the y-x or y-z plane.

Although in FIG. 3 cross sections of the scintillator element SE along its longitudinal axis LAX are shown as constant, this may not be necessarily so in all embodiments. Specifically, there are embodiments envisaged where the cross section varies along the longitudinal axis LAX. For instance, "funnel-shaped" scintillator elements having the shape of an oblique conical or pyramidal frustum may also be envisaged herein. The larger of the two faces may be arranged proximal or distal, but preferably proximal so that the scintillator element acts as an improved focused guide for the light photons.

The proximal phase S1 admits the X-radiation into the body of the scintillator element. The photons then travel along a path through the body of the scintillator element and interact with the scintillating material therein so that light photons are released. Due to the inherent obliqueness of the scintillator elements SE, more photons are released, which results in good imaging properties. The released light photons and/or at least a part of the X-ray radiation then leave or egress the scintillator element at the distal face S2 and interact with the respective photodiode Ph. Because of the oblique arrangement of the scintillator body the optical path of the X-ray photons through the scintillator element is maximized for a given overall thickness of the scintillator layer, even for radiation paths through elements SE that are situated further away from the optical axis OX of the imager IA. More particularly, as envisaged herein, the obliqueness of the scintillator element is larger with distance from the center point of the X-ray detector. To be more specific, scintillator elements at the optical axis OX or close to it will therefore have no or very little obliqueness whilst the ones further away have a higher amount of obliqueness than scintillator elements closer to the optical axis OX.

The proposed obliqueness of scintillator elements SE may be defined geometrically by using the normal n perpendicular to the proximal surface of the scintillator layer. For scintillator elements away from the optical axis OX, their respective longitudinal axis LAX will then form a non-zero inclination angle α with the normal n of the surface. In curved embodiments, the normal is a local normal, that is, it is perpendicular to a tangent plane to the proximal surface at a given location and the inclination angle can be defined relative to the said local normal n. The local normal is that of the respective proximal face S1 at the given location. In the planar embodiments, the surface normal equals the face normal n. Alternatively, obliqueness may also be defined as the non-zero angle α between the LAX and the optical axis OX. The maximum magnitude of the inclination angle is in general a function of the size of the detector's image surface. In embodiments, where the size is about X=30 cm by Z=40 cm, a ranges from 0° (for elements SE at the center point) up to about 10° for elements situated at the edge portion of the detector surface. Larger sized detectors, for instance with X>30 cam and/or Z>40 cm may call for a up to 30° or more.

The plan views in FIGS. 3C,3D further illustrate the obliqueness of the proposed scintillator layer SL and the above introduced concept of 1D and 2D alignment. In particular, as shown in FIG. 3C the respective proximal and distal phases S2 and S1 are shifted relative to each other in parallel when viewed (as shown in the view of FIG. 3C) along optical axis OX or axis V. In the embodiment of FIG. 3C, the faces S1 and S2 are shifted relative to each other only along the z axis but may be shifted instead along the x axis.

As an extension, two dimensionally shifted faces S1 and S2 are also envisaged herein as shown in plan view FIG. 3D. There, the faces S1,S2 are shifted along x and x relative to each other. For clarity, only the faces S1 and S2 are shown, with all other edges disregarded in the view of FIGS. 3D and C. FIG. 3D illustrates the above introduced concept of 2D alignment whilst FIG. 3C illustrates 1D alignment where inclination is confined to a single plane. The mutual parallel shift between the two faces S1, S2 in one or two directions determines orientation and overall inclination of the longitudinal axis of the scintillator element and hence its obliqueness.

The effective overall inclination for the case of 2D alignment can be defined as explained above in terms of the angle α between the normal and the longitudinal axis LAX but the inclination is now in a plane (shown in plan view as the dashed line) that extends between the two reference planes x-y and z-y. The components of this effective overall inclination along the reference directions x, z can be obtained as respective projections of the longitudinal axis LAX onto the reference planes x-y, z-y and the respective inclination angle components in said planes.

It is especially the 2D alignment type that allows achieving uniform imaging properties throughout the whole of the image surface of the detector XD even for planar X-ray detectors.

1D alignment is useful for curved XDs. 2D alignment is useful for flat XD to achieve scintillator elements that are 2D-dimensionally focused towards the X-ray focal spot FS.

Figure 4:
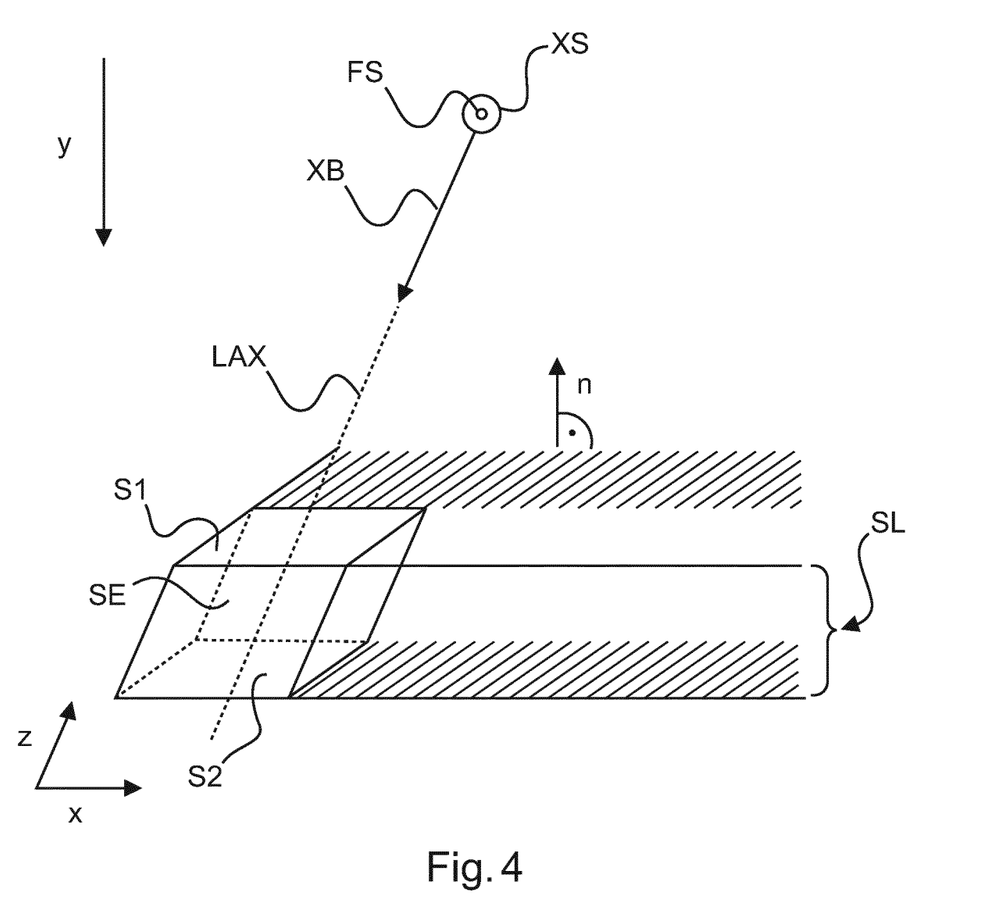
FIG. 4 shows a schematic perspective view, partly cut away, of a scintillator element forming part of a scintillator layer.

With reference to FIG. 4, this illustrates in partly-cutaway perspective view the obliqueness of the scintillator element SE. Only one such element SE is shown for clarity in FIG. 4, with the respective faces S1 and S2 being part of the scintillator layer surfaces, namely the proximal surface for S1 and the distal surface for S2. Similar to FIG. 3C, FIG. 4 shows an embodiment where the obliqueness gives rise to the 1D alignment introduced above, as the faces S1, S2 are shifted in parallel relative to each other only in one direction, in this case along axis x. Similarly, 1D alignment in direction z instead of x direction is also envisaged in alternative embodiments.

The discrete scintillator elements SE are embedded in light reflective material LRS which partly or wholly fills interspaces IS between neighboring scintillator elements SE, SE'. Wall elements extend between respective faces S1,S2, S1',S2' of the two scintillator elements SE,SE'. Respective interspaces IS are bounded by neighboring wall elements w,w' of the neighboring scintillator elements SE,SE'. The scintillator elements SE with the reflective material arranged in between form the scintillator layer SL. Suitable embodiments of the light reflective material LRS include, in one embodiment, $TiO_2$ (Titanium Dioxide)-filled epoxy, or silver or other similar materials with sufficient light reflective properties.

The proximal faces S1 (with reflective material in between) together define the proximal surface of layer SL. The faces S1 are parallel to each other and are aligned along the v-axis to form the proximal surface as a flush surface. In embodiments, the same holds true for the distal faces S2 forming an equally flush distal surface, in other words, the distal faces S2 lie in the same plane or curved surface. The respective lengths of the scintillator elements SE (along their respective axis LAX) may hence not be equal for all scintillator elements SE. Specifically, scintillator elements SE further way from the optical axis OX may be longer than scintillator elements SE closer to the optical axis OX.

In alternative embodiments, the respective lengths of the scintillator elements (along their respective axis LAX) may be made equal so that the distal faces S2 not necessarily lie in the same plane/surface.

If the respective lengths of the scintillator elements SE (along their respective axis LAX) are unequal, the above mentioned imaging properties may still be uniform due to an unequal pixel pitch, in embodiments. This is because for longer scintillator elements that are further away from the optical axis OX there may be a larger distance between neighboring pixels Ph, with more volume between the respective distal face S2 and the respective photodetector Ph, thus compensating for the unequal path length along LAX for the said longer scintillator elements SE.

There may also be, for manufacturing reasons (more on which further below at FIG. 8), a substrate from which the SE extend towards the focal spot FS. The substrate may be arranged proximal or distal, with either the proximal or distal faces S1, S2 adjoined thereto.

Figure 5:
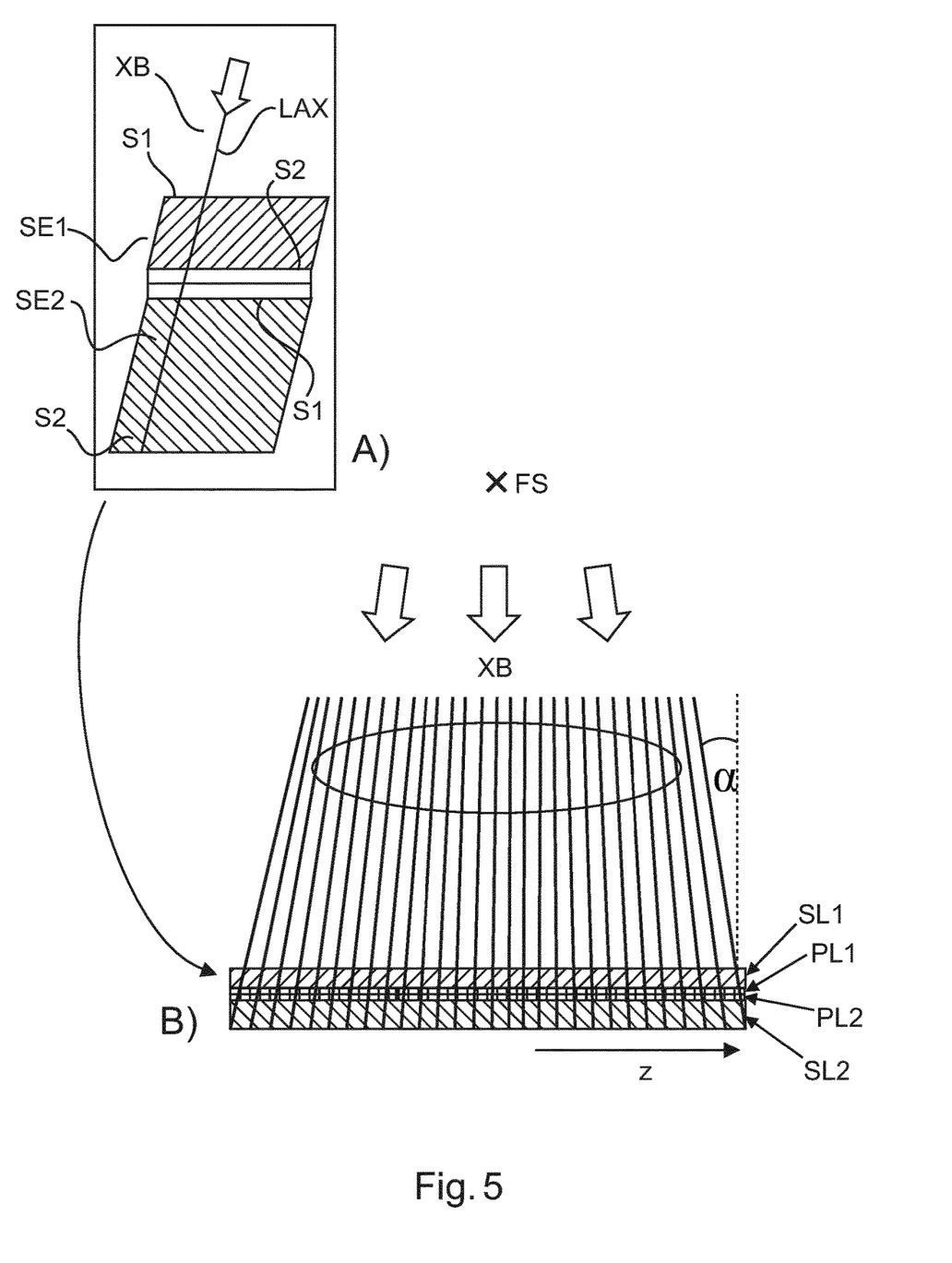
FIGS. 5 and 6 show in schematic fashions different embodiments of a scintillator layer in a dual layer detector for dual energy/spectral imaging.

All that has been said above, is of equal application for dual or spectral imaging X-ray detectors with multiple pairs of sensor-scintillator layers. In this connection, reference is now made to FIGS. 5 and 6. The Figures show schematic sectional side elevations of such detectors XD for spectral/dual energy imaging with a dual layer detector. The views are along directions x and z, respectively. FIG. 5 shows a representation of an embodiment with planar configuration whilst FIG. 6 shows a curved configuration.

More specifically, in spectral/dual energy imaging with a dual layer detector, there are (at least) two scintillator layers SL1, SL2 and, in embodiments, two sensor layers PL1, PL2. Arrangements with more than two scintillator layers and/or sensor layers are also envisaged herein.

Figure 6:
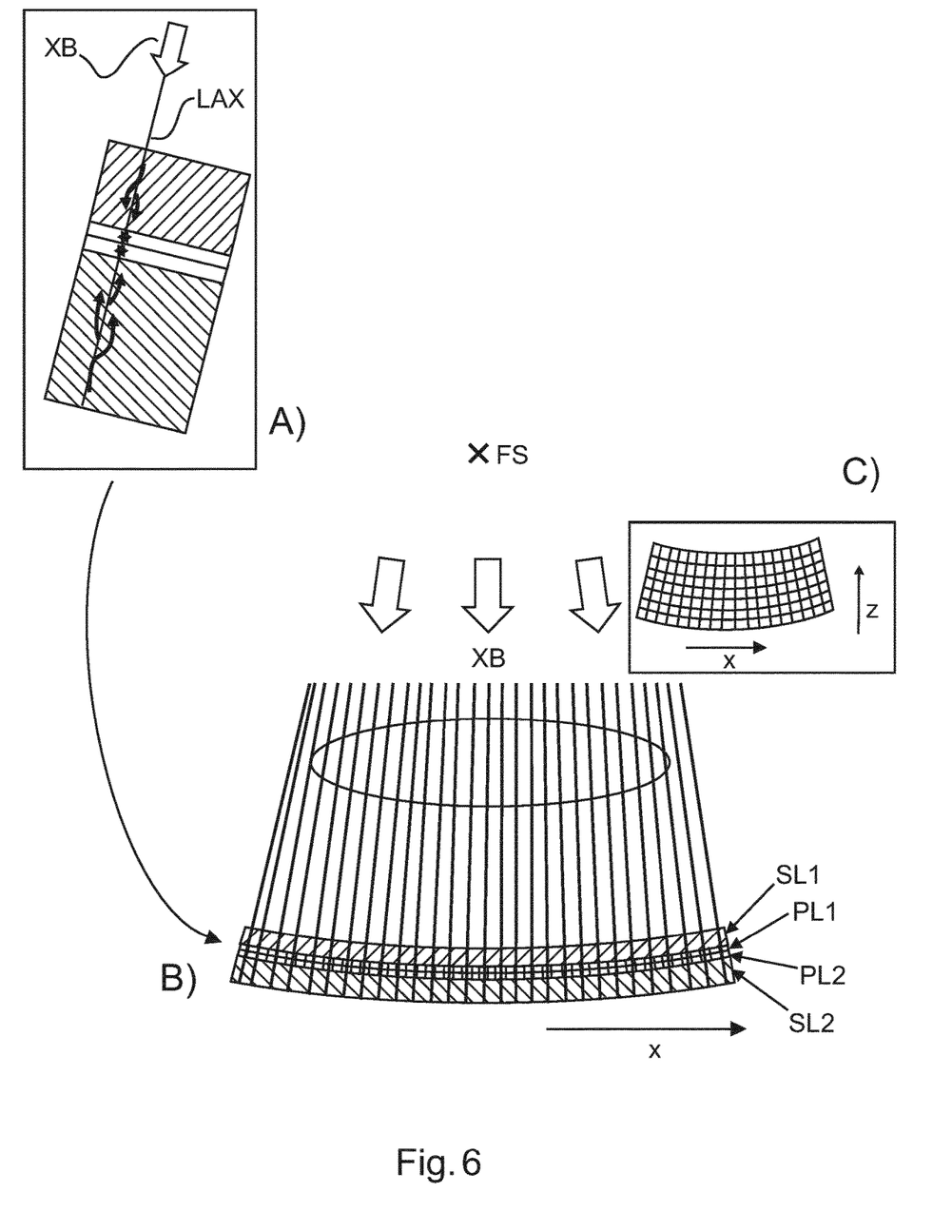

More particularly, in FIG. 5B,6B, the first detector comprises the first scintillator layer SL1 and underneath it an associated sensor layer PL1. This pair of layers is then followed by the layers of the second detector which also includes a second sensor layer PL2 and an associated (second) scintillator layer SL2. In the arrangement in FIG. 5,6 the two sensor layers PL1 and PL2 are sandwiched between the two scintillator layers SL1 and SL2 so that the sensor layers PL1, PL2 are back-to-back. Alternatively, the scintillator layer SL1,2 and the sensor layers PL1,2 alternate so that sensor PL1 is followed by and coupled to the (second) scintillator layer SL2. This interleaved arrangement pattern is facilitated in particular thanks to the flush proximal surface of the scintillator layer as mentioned above.

The obliqueness of the respective scintillator elements SE1 and SE2 is shown at inset FIG. 5A. In this example, a 1D alignment along: direction is shown. The respective obliqueness of the scintillator elements SE1, SE2 are $\alpha$ and $\alpha+180°$ so as to form a continuous radiation path through the two scintillator elements SE1, SE2 along the two longitudinal axes LAX of the two scintillator elements. In other words, the two longitudinal axes align along a common line. Again, the obliqueness of the scintillator elements in both layers may be such that they are only oblique in one single dimension such as along axis Z as is shown in FIG. 5. Alternatively, there may be 2D alignment with focal spot FS so the elements SE1, SE2 are inclined along in addition in second direction. The second direction of alignment extends into the drawing plane of FIG. 5 along axis x. It is also in the embodiment of this 2D alignment arrangement that the two elements SE1, SE2 have their respective axes aligned so as to form a common line.

FIG. 6B shows a curved embodiment for a dual/spectral imaging with a double layered detector similar to the one described in FIG. 5A, B. As mentioned earlier the curved detector layers form a partial lateral surface of an imaginary cylinder whose axis of curvature extends through the focal spot FS and parallel to axis z in FIG. 6B. Inset FIG. 6C illustrates the curvature schematically in a perspective plan view (in 3D), when viewed from the focal spot FS.

In this curved embodiment as further shown in inset FIG. 6A, the detector elements are preferably 1D aligned, for instance along axis z (as exemplary shown) or along axis x, so are not inclined along the other dimension x or z, respectively. In other words, the obliqueness in z direction takes care of alignment to focal spot FS along that direction whilst the curvature of the detector effects the alignment towards the focal spot along the second direction x which is across the axis of curvature along z. In this curved embodiment, the view perpendicular to the axis of curvature (in this exemplary case along axis x) would be similar to the view afforded by FIGS. 5A, B where the obliqueness along z is now visible (FIG. 5A). The small curved arrows in inset FIG. 6B illustrate the emanating light photons.

A similar curved arrangement is also envisaged for the single detector layer embodiment as per of FIG. 2.

Whilst in the following main reference will be made to use of two scintillator layers SL1,SL2 in dual layer detectors, it will be understood that properties and aspects described below are also applicable to conventional, non-dual imaging applications where adding up the two (top and bottom) images gives a conventional single image (with improved DQE (Detective Quantum Efficiency).

In dual imaging as envisaged herein, the detector is arranged as a dual layer detector XD that is configured to detect simultaneously X-radiation at at least two different energies. The two images so detected, one for higher energy and one for lower energy, can be image-processed into other imagery, such as imagery with material specific contrast for material decomposition, atomic number specific contrast, spectral images, etc, as described elsewhere such as in R Alvarez and A Macovski, "*Energy-selective reconstructions in X-ray computerized tomography*", Phys. Med. Biol., vol 21(5), 1976, pp 733-744.

In embodiments, the dual layer detector XD comprises two scintillator layers SL1,SL2 (as described above), one proximate and one distal, and at least two light-sensitive surfaces LSS1, LSS2 (again, one proximate and one distal) each including a layout of light sensitive pixels PH as described above. In some embodiments (but not necessarily in all embodiments), the number of scintillator elements in the two scintillator layers are equal, preferably with corresponding scintillator elements from the proximal SL1 and distal SL2 scintillator layers in registry with their longitudinal axes aligned.

The light sensitive surfaces LSS1,LSS2 may be arranged on a single (substrate) layer BL, with pixels receptive from distal and proximal sides, thus presenting two light sensitive surfaces LSS,LSS' on the distal side of a substrate layer BL and the other on the proximal side). The substrate may be arranged as thing foil or other to admit passage of light. Similar such "two-sided" single sensor layers PL have been described in Applicant's WO 2018/122213 A1. Alternatively, the two light sensitive surfaces may be formed by two sensor layers arranged on the distal and proximal side, respectively, on a single substrate layer. As a further alternative, the two light sensitive surfaces LSS1,LSS2 are arranged on physically separate layers BL1,BL2, that are attached to each other, or stacked "back-to back"), 5,6, with the light sensitive surfaces LSS1,LSS2 facing in opposite directions. Yet in further alternative embodiments, the two sensor layers SL1,SL2 are spatially separated by interposition of at least one of the two scintillator layers).

In the dual layer detectors envisaged herein, both light sensitive surfaces LSS1,LSS2 are arranged between the two scintillator layers SL1, SL2. The two light sensitive layers may be oriented in the same direction, towards the X-ray source.

The two scintillator layers SL1, SL2 are arranged on respective ones of the light sensitive surfaces LSS1, LSS2 by gluing or are otherwise affixed. In one embodiment, the proximal faces of the distal scintillator layer SL2 are further affixed to the proximal sensor layer SL1.

Neighboring sidewalls w1,w1' and w2,w2' defines the interspaces IS,IS' between scintillator elements SELSE1', SE2,SE2'. Although main reference is made to one of the scintillator layers SL2 and to a pair of neighboring scintillator elements SE2, SE2', this is merely for illustration and explanation and all the below is of equal application to the other scintillator layer SL1 and/or to other scintillator elements SE1,SE1'. Neighboring sidewalls w2,w2' of two neighboring scintillator elements SE2,SE2' extend between their respective faces S1,S2 and S1',S2' (see FIG. 2). Because of the mutually inclined (non-parallel) neighboring sidewalls w2, w2' of the neighboring scintillator elements SE2, SE2', the respective interspace IS is tapered. In particular, the interspace IS may be wedge shaped. As mentioned earlier, the interspace IS is wholly of partly filled with the light reflective filler material LRS as described above in FIG. 2. Because of the focused arrangement, the respective longitudinal axes of corresponding proximal SE1 and distal SE2 scintillator elements of the two scintillators layers SL1 SL2 are aligned so that the interspaces IS' in the proximal scintillator layer SL1 are narrower and/or smaller than the interspaces IS in the distal scintillator layer SL2. In particular, the interspaces IS in proximate scintillator layer SL1 are formed as smaller wedges than the interspaces IS' in the distal scintillator layer SL2. In some embodiments, respective side walls w1,w2 and from scintillator elements in the proximal SL1 and distal SL2 layer are aligned.

Equidistant pixel pitch layouts may be used in the light sensitive surfaces LSS2, LSS1. The pixel pitches may be equidistant for each surface LSS, LSS' separately, but may be different from each other. Alternatively, the equidistant pitch layout is the same for the two scintillator layers SL1,SL2. Having equidistant pitches allows to simplify image processing and/or the detector can be manufactured more effectively, in particular when using two identical image sensors as envisaged herein in some embodiments. Moreover, equidistant image sensors are more versatile in usage and independent of the source-detector distance in a system and therefore can be used in various system configurations or applications.

It is not necessary herein to have any two neighboring scintillator elements SE', SE to have inclined neighboring walls although this is envisaged in embodiments. Alternatively, the layer includes runs of scintillator elements with parallel neighboring walls followed by one or runs of scintillator elements with walls at a different inclination. It is then neighboring walls of scintillator elements from two consecutive runs that may have their neighboring walls inclined relative each other as mentioned above.

The respective heights h of the scintillator elements SE, SE' in one or both of the scintillator layers SL1,SL2 may not necessarily be equal but may differ as shown by height difference A. Preferably the height is lower for more central scintillator elements SE as compared to scintillator elements SE situated away from the center towards the periphery of the detector XD. This allows obtaining a (more) homogenous noise distribution over the entire area of acquired imagery. It is not necessary to have a monotonic increase of height from center toward the periphery. Instead, there may be runs of one or more SEs with the same height, followed by one more runs of SEs having respective different and increasing heights. Scintillator elements of differing heights may also be used in any of the embodiments in Figs A)-C) or FIGS. 2,5 and 6.

1D or 2D alignment is envisaged in any of embodiments as explained above in FIGS. 5, 6.

Figure 7:
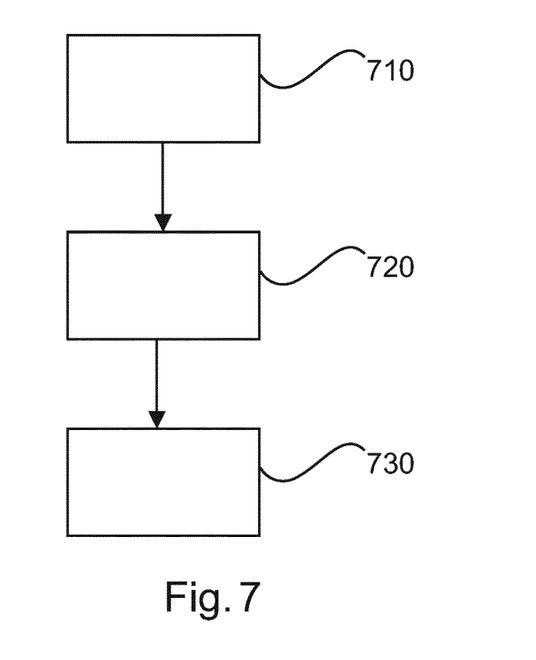
FIG. 7 shows a flow chart of a method of manufacture of a scintillating layer comprising scintillator elements.

Reference is now made to FIG. 7 which shows steps in a manufacturing process for a scintillator element having oblique, discrete scintillator elements as discussed above in the previous Figs.

Preferably, the scintillator layer SL is formed by additive manufacturing such as 3D printing from suitable materials. Suitable materials include crystalline particles embedded in a mass of non-scintillating binder material.

Unlike more conventional approaches, no grown crystal needles (such as CsI, Cesium Iodide) are used herein, but instead the particle-in-binder scintillator preparation is envisaged, to form the scintillator layer. Embodiments for the particle-in-binder scintillator material includes Terbium-doped Gadolinium Oxysulfide ($Gd_2O_2S$:Tb) particles or Praseodymium-doped Gadolinium Oxysulfide ($Gd_2O_2S$:Pr) particles or other scintillating materials such as $Y_2O_2S$, or garnet particles, etc. The scintillating materials are mixed in a binder material, such as a resin, or other materials capable of forming a slurry.

Preferably the particle-in-binder scintillator material, from which the scintillator elements are to be manufactured, is itself provided in thin sub-layers, thinner than the envisaged total thickness of the scintillator layer. The scintillator elements are then gradually built up from these sub-layers in the following manner and according to one embodiment:

In step S710, a first of the mentioned sub layers-is provided. This may be deposited on a substrate (eg, glass or other) but this is optional and methods as envisaged herein where no underlying foundation substrate is used. In one embodiment the scintillator layer is erected on the detector layer PL itself, in which case the detector layer PL forms the substrate. The substrate may be formed by a relatively stiff curved sensor plate as in the embodiment of FIG. 6. The proposed method thus allows avoiding depositing on foil-type substrates. Such foil-based substrates were used before to assist building scintillators for curved detectors from the above mentioned crystal needles.

Although CsI scintillators can be fully replaced by the newly proposed scintillator layer SL, CsI may still may be used in alternative embodiments in combination with the newly proposed scintillator layer SL. For instance, in the dual energy/spectral imaging embodiments of FIG. 6, the scintillator configuration may be CsI for the top layer instead of SL1, while SL2 is as proposed herein, or the other way round, CsI is used instead for the lower layer SL2 whilst the top layer SL1 is as proposed herein.

Although in all of the above embodiments, each sensor layer PL has only a single scintillator layer SL, this may not necessarily be so for all embodiments. Specifically envisaged herein are also configurations arrays where there are at least two scintillator layers for a given sensor layer. More specifically, in embodiments two scintillator layers are arranged on two opposite sides of the respective sensor layer PL Thus, in this embodiment, the sensor layer PL may be illuminated by scintillator light from two opposite sides. If this double-sided arrangement is used in the dual energy/spectral imaging embodiments of FIGS. 5,6, it will be understood that the two layers PL1,PL2 are no longer back to back. Instead, two of the (then four) scintillators layers will be back-to-back.

In step S720, the scintillator is then formed, preferably by using a suitable additive manufacturing technique such as 3D printing such as, preferably, selective laser sintering (SLS), or stereolithography (SLA).

The lengths along their respective length axis of the scintillator element may be formed so as to be equal or the lengths may vary with distance from the center of the layer, with longer scintillator elements further away from the center/optical axis.

Laser based techniques are envisaged. In embodiments, the first-sub layer is exposed to a laser beam at a plurality of discrete locations on the first-sub-layer. At each location the sub layer is locally fused or hardened (in case of a photosensitive binder) to define a cross-section in the sub-layer of a given scintillator element to be built. This process is repeated in sequence or in parallel across the surface of the sub-layer, locally at suitably spaced locations to so define the layout of the desired scintillator element array. In the fusion process, the molecular structure of the scintillator-in-binder material changes (compared to the non-fused portions) whilst the particles' scintillating ability is maintained.

Step S720 is then repeated on a second sub-layer after depositing the second sub-layer on top of the first one. Specifically, the second sub layer deposited on the first layer and the above described local fusing/hardening by laser is then repeated, however this time at locations that are slightly shifted as compared to the locations in the earlier sub-layer. The amount of shifting corresponds to the desired obliqueness for the given scintillator elements at that location. The amount of shifting is trigonometrically related to the described obliqueness and the given height of the current sub-layer. The shifting may be achieved by moving the laser dispensing device or by moving the sub-layer(s).

Step S720 is then repeated until all sub-layers have been processed as above described, each time slightly shifting the locations (where the material is fused/hardened) as compared to the foregoing sub-layers.

At this stage of production, the "would-be" elements SE are still embedded in the surrounding sub-layer material. Once all cross-sections of all would-be scintillator elements have been laser-defined across all sub-layers, this multi-layer assembly (made up of the sub-layers) has now the desired height of the final scintillator layer SL.

The multi-layer assembly has then the remaining excess material removed. This may be done by applying an etching substance (in an etch bath for instance) that acts only on the non-fused portions left between the locally fused portions to dissolve the remaining excess material which can then be flushed away to leave only the oblique scintillator elements exposed, with the discrete proximal faces embossed. It will be appreciated that due to the shifting, the connecting edges between faces S1,S2 of the scintillator elements will have, at a certain magnification scale, a stepped profile.

In another step S730, a light reflective filler material LRS is then filled into the inter-spaces between the scintillator elements. The light reflective material LRS may be provided as a paste which is then worked into the inter-spaces and made flush with the proximal faces S1 of the scintillator elements. In embodiments, this is done by filling/pouring the light reflective material LRS, possibly under vacuum, into the interspaces.

The whole structure may then be left to solidify to so finalize production of the scintillator layout with the desired distribution and variance of obliqueness so that the scintillator elements are together aligned with the focal spot of the imaging apparatus IA. As mentioned, the central scintillator element (that is, the one positioned along the optical axes) may remain straight.

The obliqueness of off-center scintillator elements should all ideally vary with distance from the optical axis OX to achieve best alignment with the focal spot FS. That is, any two neighboring elements SE should ideally have different obliqueness. However, this may not necessarily be so in all embodiments. For instance, certain "runs" or groups of neighboring scintillator elements may be arranged to have the same obliqueness. This allows simplifying the above described manufacturing process. Specifically, the control program for the 3D manufacturing device can be simplified for better throughput. In particular, the forming step S720 with its iterations over the sub-layers may be executed in batches to form groups of scintillator elements with the same obliqueness rather than producing each and every scintillator element individually with a bespoke obliqueness, although this too is envisaged in alternative embodiments.

Further Additive 3D printing techniques envisaged herein include fused deposition modeling (FDM), multi-jet modeling (MJM), inkjet 3D printing, or other. Optionally, after 3D printing, but before applying the light reflective material LRS, the whole structure may be ceramicized by sintering in a sintering oven.

As an alternative to 3D printing, -CNC machining is also envisaged.

As will be appreciated from the above, at the conclusion of the processing the scintillator elements SE emerge as 3D printed, discrete scintillator structures.

It will also be appreciated that in particular in the planar detector embodiments (FIG. 2, FIG. 5), due to the inherent obliqueness of the scintillator elements, flushed surfaces by the proximal and/or distal surfaces of the scintillator are achieved. The flushed surfaces are formed by the distal and proximal faces, respectively. The flush surfaces promote integral mechanical stability especially when two or more detector layers are stacked one on top of each other as shown in FIGS. 5, and 6. Preferably it is the proximal surfaces that lie in the same plane and form the flush surface. This may or may not hold true for the distal surfaces. In particular, the distal surfaces may not necessarily lie in the same surface if the lengths (along their respective longitudinal axis LAX) of the scintillator elements is equal for scintillator elements at different distances from the center of the layer/optical axis OX. Preferably, both the proximal and distal faces form respective flush surfaces, with lengths of the scintillator elements differing, with longer scintillator elements SE the further away from the center/optical axis OX.

The total thickness of the scintillator layer equals the height (measured vertically, along axis y) of the scintillator elements which can be in the region of 100-1000 micrometers (µm) or more specifically 100-600 µm, but other thicknesses are also envisaged.

Figure 8:
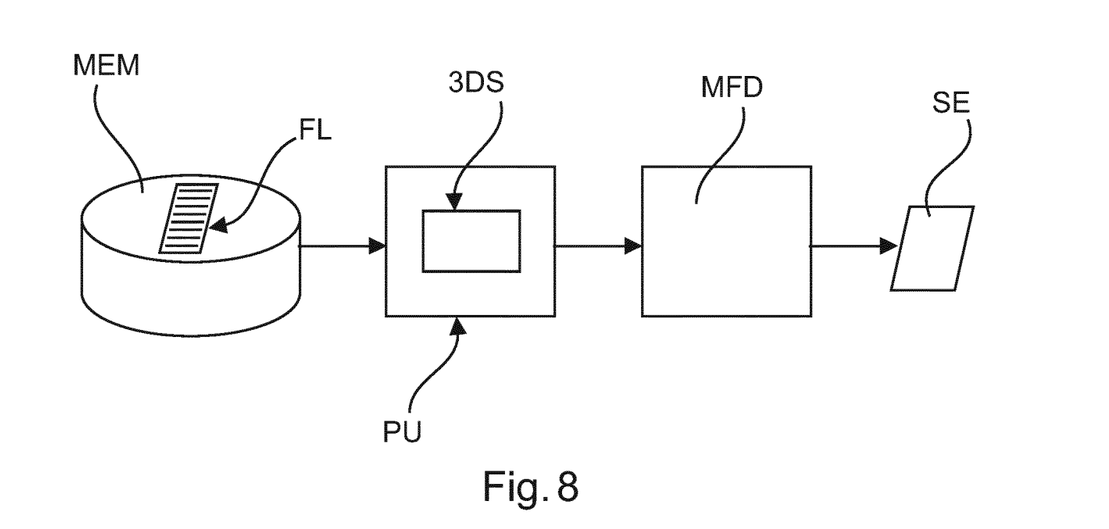
FIG. 8 shows a schematic work flow diagram for 3D printing of the plurality of scintillator elements.

FIG. 8 shows a schematic work flow diagram for 3D printing of the plurality of scintillator elements SE of the newly proposed scintillator layer SL.

Information on the desired geometric shape of the scintillator elements SE is described by a suitable CAD language in a suitable format such as STL ("stereolithography"), OBJ, PLY or other, depending on the exact 3D printing technology used. This information is held in a computer file FL. In one embodiment this is a CAD file. In embodiments, the desired geometry of the scintillator layer SL in the geometry file FL is described in terms of a collection of surfaces stored in the file FL. Each surface is defined by vertices and an orientation through its normal. The scintillator layer SL/ scintillator elements SE is/are then defined as a surface model that can be built up from a collection of those surface elements in the right orientation.

The geometry describing file FL can be stored in a suitable memory MEM, such in permanent memory of a computing unit or on a moveable memory media such as a memory stick. CD memory card or otherwise.

A data processing unit PU such as a laptop or desktop computer or tablet, or one or more servers (with or without cloud architecture), or other suitable computing unit, runs 3D slicer software that reads in the geometric information from the geometry file FL and translates this into slices and related commands suitable to control operation of the 3D printer MFD through suitable interfaces. Specifically, the 3D slicer translates the geometry information into the above mentioned control program or code such as G code and C program language or other.

3D printing allows in particular to form the desired obliqueness and orientation at the required angular inclination.

A similar work flow applies for instance for the case where the material forming device MFD is a CNC milling equipment.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium (in particular, but not necessarily, a non-transitory medium), such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A dual layer detector for X-ray imaging, comprising:
 at least two light sensitive surfaces;
 a first scintillator layer including a first scintillator element and a second scintillator element configured to convert X-radiation into light, the first scintillator element neighboring the second scintillator element;
 a second scintillator layer, wherein at least one of the light sensitive surfaces is arranged between the first and second scintillator layers,
 wherein the first scintillator element has two faces, wherein the two faces are an ingress face configured to admit the X-radiation into the first scintillator element and an egress face distal from the ingress face, wherein the two faces are arranged shifted relative to each other, so that a longitudinal axis of the first scintillator element is inclined relative to a normal line of the ingress face, the normal line intersecting the longitudinal axis at the ingress face, wherein the first scintillator element has a sidewall extending between the two faces, the second scintillator element having a sidewall, wherein the sidewall of the first scintillator element and the sidewall of the second scintillator element are neighbored, and wherein the sidewall of the first scintillator element and the sidewall of the second scintillator element are inclined relative to the normal line at different angles, respectively, to define a wedge-shaped interspace or gap.

2. The dual layer detector of claim 1, wherein the at least one respective scintillator element has at least one of an oblique prism shape, and an oblique conical shape.

3. The dual layer detector of claim 1, wherein a cross-section of respective said at least one element is a polygon.

4. The dual layer detector of claim 1, wherein respective cross sections of the respective at least one scintillator element are constant along a longitudinal axis.

5. The dual layer detector of claim 1, wherein the two faces are arranged shifted along at least two different directions.

6. The dual layer detector of claim 1, wherein the respective at least one element is formed by additive manufacturing.

7. The dual layer detector as per claim 1, further comprising a light reflective substance at least partly surrounding the respective element.

8. The dual layer detector as per claim 1, wherein respective longitudinal axes of the respective scintillator elements pass through their respective faces and aligned so as to focus on an imaginary spatial point located outside the layer.

9. The dual layer detector as per claim 1, wherein the two light sensitive surfaces are arranged between the two scintillator layers.

10. The dual layer detector of claim 1, wherein a connecting edge of the first scintillator element, which is arranged between the ingress face and the egress face, has a stepped profile.

11. The dual layer detector as per claim 1, further comprising a light reflective substance disposed in the wedge-shaped interspace or gap,
 wherein the light reflective substance includes a first sidewall and a second sidewall, the first sidewall being in surface contact with the sidewall of the first scintillator element, the second sidewall being in surface contact with the sidewall of the second scintillator element, and
 wherein the first sidewall and the second sidewall are inclined relative to the normal line at different angles, respectively, to define a wedge-shaped light reflective substance portion between the neighboring scintillator elements.

12. An X-ray imaging apparatus, comprising:
an X-ray source comprising a focal spot; and
a dual layer detector for X-ray imaging, comprising:
  at least two light sensitive surfaces;
  a first scintillator layer including a first scintillator element and a second scintillator element configured to convert X-radiation into light, the first scintillator element neighboring the second scintillator element;
  a second scintillator layer, wherein at least one of the light sensitive surfaces is arranged between the first and second scintillator layers,
wherein the first scintillator element has two faces, wherein the two faces are an ingress face configured to admit the X-radiation into the first scintillator element and an egress face distal from the ingress face, wherein the two faces are arranged shifted relative to each other, so that a longitudinal axis of the first scintillator element is inclined relative to a normal line of the ingress face, the normal line intersecting the longitudinal axis at the ingress face, wherein the first scintillator element has a sidewall extending between the two faces, the second scintillator element having a sidewall, wherein the sidewall of the first scintillator element and the sidewall of the second scintillator element are neighbored, and wherein the sidewall of the first scintillator element and the sidewall of the second scintillator element are inclined relative to the normal line at different angles, respectively, to define a wedge-shaped interspace or gap.

\* \* \* \* \*